United States Patent
Schachter et al.

(10) Patent No.: US 8,768,772 B2
(45) Date of Patent: Jul. 1, 2014

(54) SYSTEM AND METHOD FOR SELECTING ADVERTISING IN A SOCIAL BOOKMARKING SYSTEM

(75) Inventors: Joshua Schachter, Mountain View, CA (US); Albert Wenger, Scarsdale, NY (US)

(73) Assignee: Yahoo! Inc., Sunnyvale, CA (US)

(*) Notice: Subject to any disclaimer, the term of this patent is extended or adjusted under 35 U.S.C. 154(b) by 764 days.

(21) Appl. No.: 11/273,580

(22) Filed: Nov. 14, 2005

(65) Prior Publication Data

US 2007/0067331 A1    Mar. 22, 2007

Related U.S. Application Data

(63) Continuation-in-part of application No. 11/231,337, filed on Sep. 20, 2005.

(51) Int. Cl.
  *G06Q 30/02*   (2012.01)
  *G06Q 30/00*   (2012.01)

(52) U.S. Cl.
  CPC ..... *G06Q 30/0263* (2013.01); *Y10S 707/99943* (2013.01)
  USPC .......... 705/14.6; 705/14.49; 705/14.73; 707/999.102

(58) Field of Classification Search
  CPC .......................... G06Q 30/02; G06Q 30/0263
  USPC .......... 705/14, 14.4, 310, 14.49, 14.73; 707/999.102
  See application file for complete search history.

(56) References Cited

U.S. PATENT DOCUMENTS

| | | | |
|---|---|---|---|
| 6,009,410 A | 12/1999 | LeMole et al. | |
| 6,141,010 A | 10/2000 | Hoyle | |
| 6,223,178 B1 | 4/2001 | Himmel et al. | |
| 6,311,194 B1 | 10/2001 | Sheth et al. | |
| 6,557,028 B2 | 4/2003 | Cragun | |
| 6,892,181 B1 * | 5/2005 | Megiddo et al. | 705/14 |
| 6,950,861 B1 | 9/2005 | Amro et al. | |
| 7,055,094 B2 | 5/2006 | Imielinski et al. | |
| 7,523,096 B2 * | 4/2009 | Badros et al. | 1/1 |
| 7,603,352 B1 | 10/2009 | Vassallo et al. | |
| 7,668,821 B1 | 2/2010 | Donsbach et al. | |
| 8,346,950 B1 | 1/2013 | Andressen et al. | |
| 2001/0007980 A1 * | 7/2001 | Ishibashi et al. | 705/26 |
| 2002/0095443 A1 * | 7/2002 | Kovack | 707/513 |
| 2002/0178015 A1 * | 11/2002 | Zee | 705/1 |
| 2002/0178223 A1 | 11/2002 | Bushkin | |

(Continued)

*Primary Examiner* — John G Weiss
*Assistant Examiner* — Adam Chornesky
(74) *Attorney, Agent, or Firm* — Hickman Palermo Truong Becker Bingham Wong LLP

(57) ABSTRACT

One aspect relates to a social bookmarking system that has the capability of displaying advertisements based on user input provided to the system. Advertisements displayed to the user may be determined based on one or more classifications provided by the social bookmarking system and selected by the user. Further, classification information that is created, used, or otherwise associated with the particular user may be used to determine ads displayed to that user. Another aspect relates to a system for collecting user classifications of content and using such classifications to match ads to appropriate content. In such a manner, more appropriate associations between ads and content may be made. Such classifications may be collected, for example, using a social bookmarking system. Further, advertisers may subscribe to classifications created in the social bookmarking system, allowing their advertisements to be displayed to users that perform actions with the subscribed classification. Also, advertisers may be permitted to submit their own classification information to the social bookmarking system.

11 Claims, 10 Drawing Sheets

(56) References Cited

U.S. PATENT DOCUMENTS

| | | |
|---|---|---|
| 2002/0184095 A1* | 12/2002 | Scullard et al. ............... 705/14 |
| 2004/0181525 A1* | 9/2004 | Itzhak et al. .................. 707/5 |
| 2005/0114357 A1 | 5/2005 | Chengalvarayan et al. |
| 2005/0261962 A1* | 11/2005 | Chuah ........................ 705/14 |
| 2006/0047643 A1 | 3/2006 | Chaman |
| 2006/0242178 A1 | 10/2006 | Butterfield et al. |
| 2006/0282328 A1* | 12/2006 | Gerace et al. ............... 705/14 |
| 2007/0011155 A1 | 1/2007 | Sarkar |
| 2007/0033531 A1 | 2/2007 | Marsh |
| 2007/0067297 A1 | 3/2007 | Kublickis |
| 2007/0124208 A1 | 5/2007 | Schachter et al. |
| 2007/0226077 A1 | 9/2007 | Frank et al. |
| 2007/0299978 A1 | 12/2007 | Neumann et al. |
| 2008/0147810 A1* | 6/2008 | Kumar et al. ............... 709/206 |
| 2010/0087099 A1 | 4/2010 | Fadell et al. |

* cited by examiner

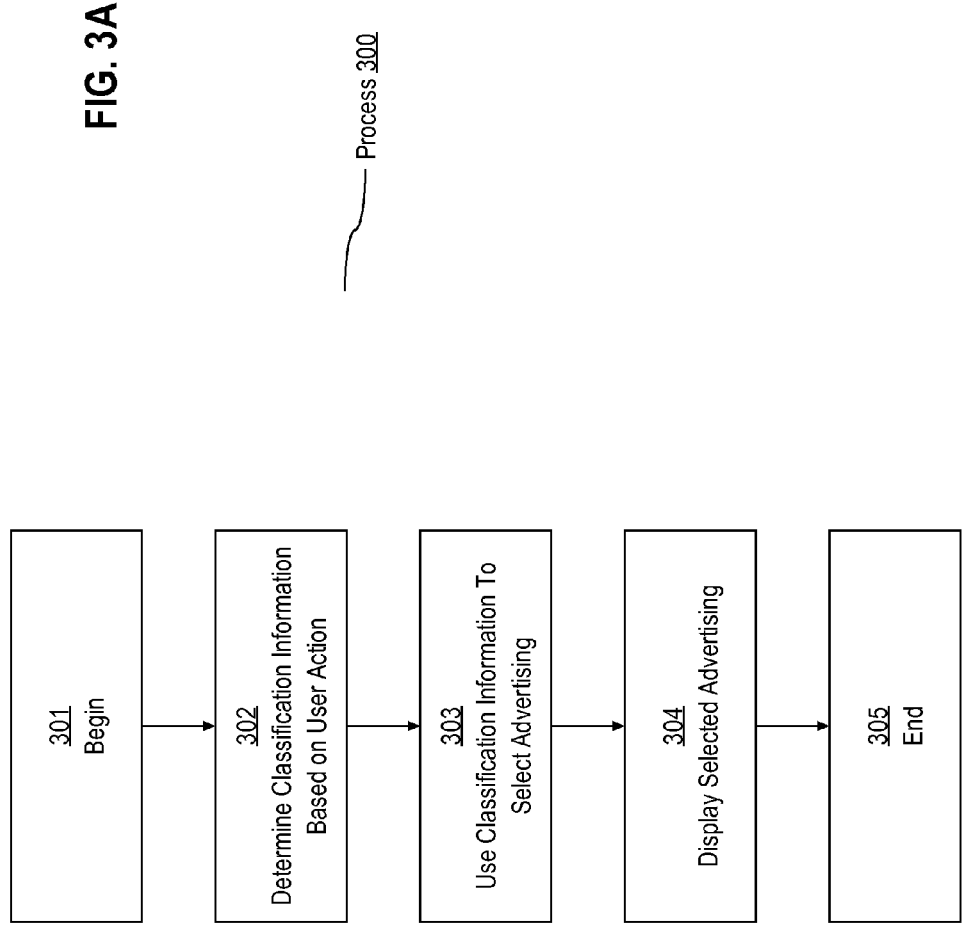

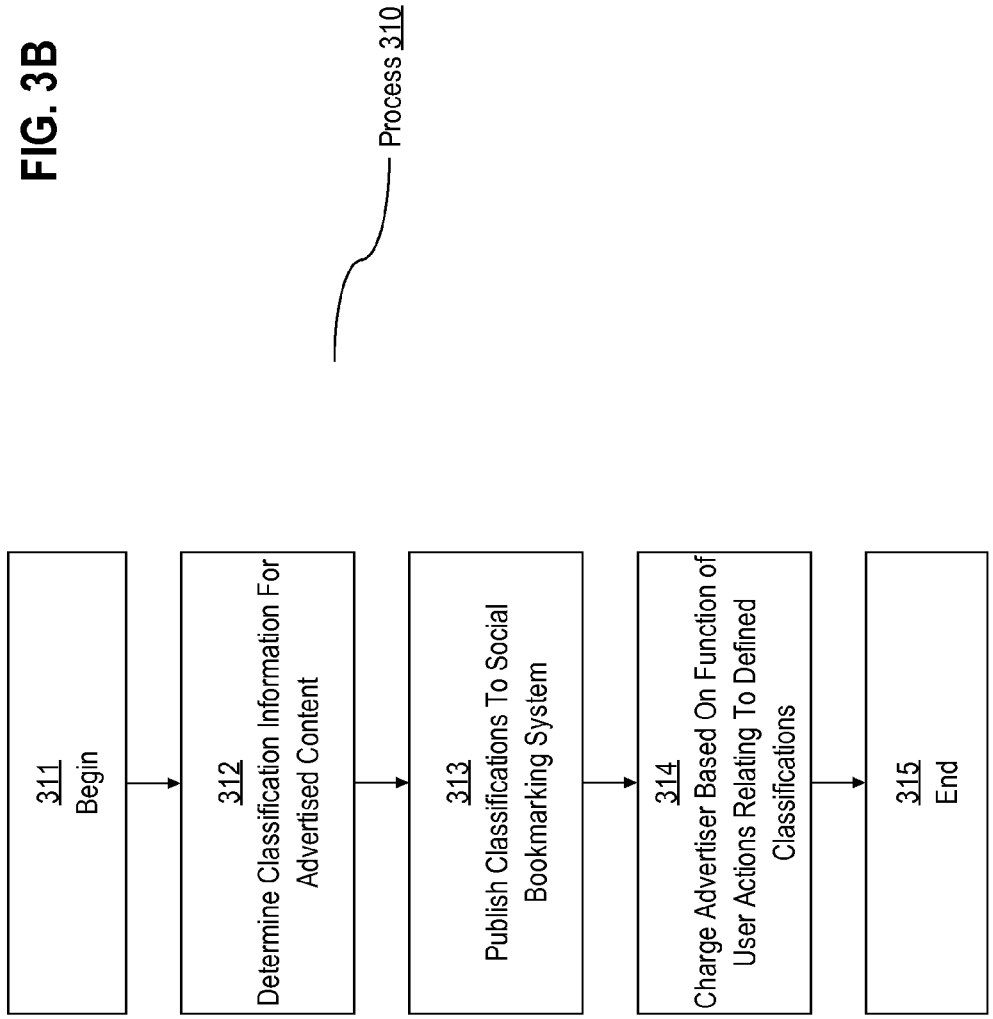

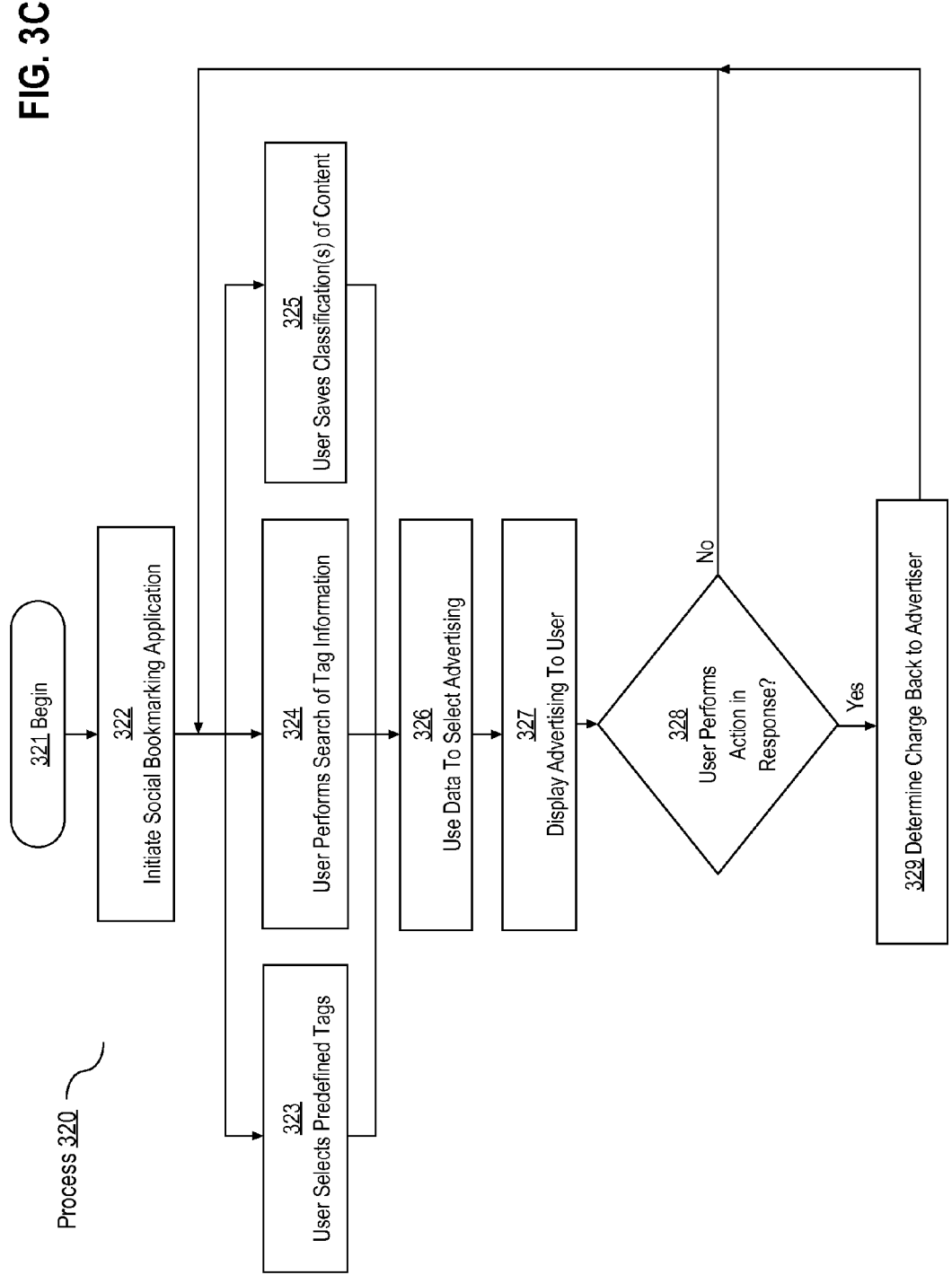

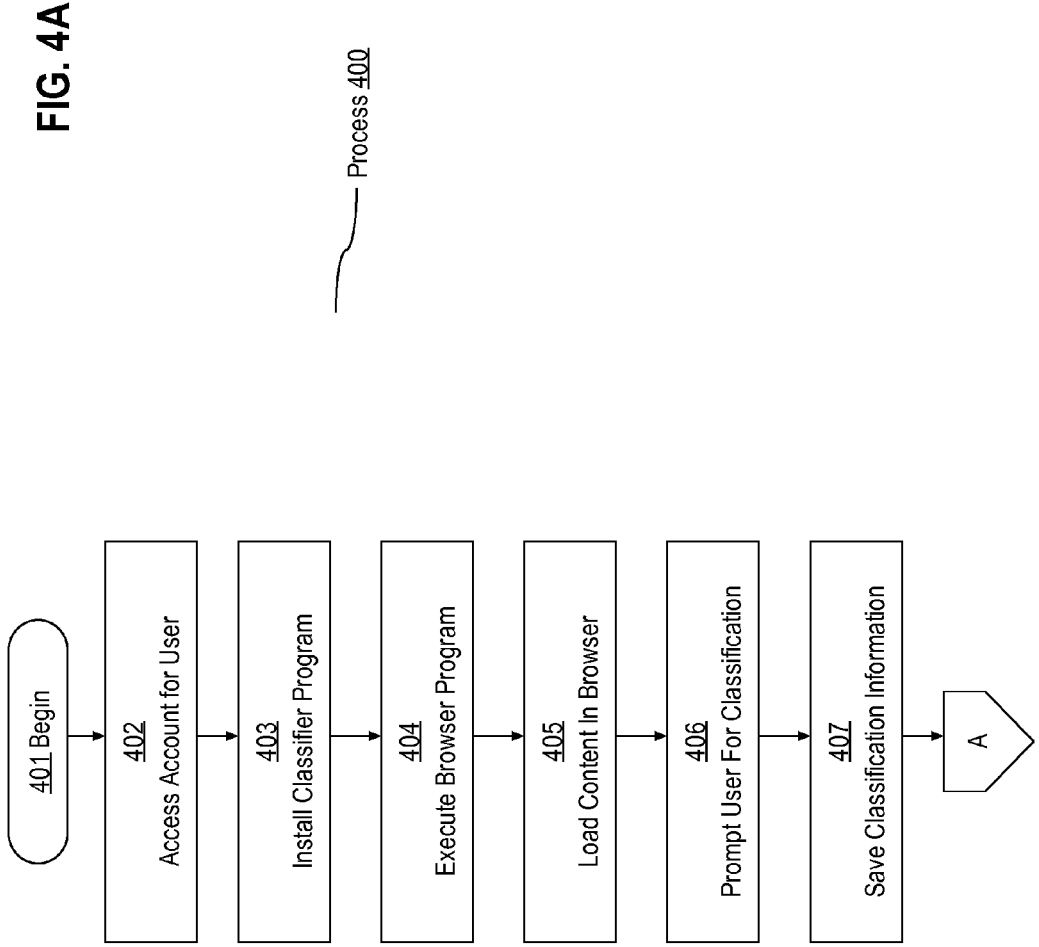

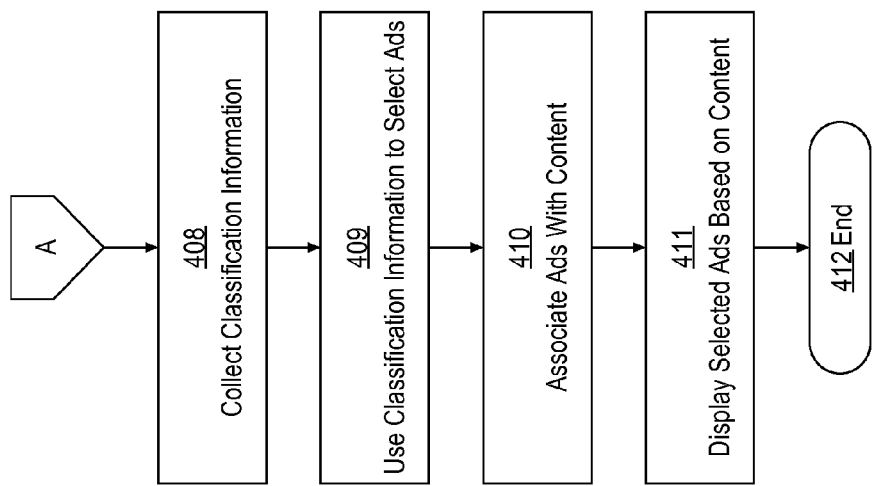

SYSTEM AND METHOD FOR SELECTING ADVERTISING IN A SOCIAL BOOKMARKING SYSTEM

RELATED APPLICATIONS

This application is a continuation-in-part of U.S. application Ser. No. 11/231,337, entitled "SYSTEM AND METHOD FOR SELECTING ADVERTISING" by J. Schachter, et al. filed Sep. 20, 2005, the application being incorporated herein by reference.

BACKGROUND OF THE INVENTION

1. Field of the Invention

The field of the invention relates generally to Internet technologies, and more specifically, to web-based advertising.

2. Discussion of the Related Art

A basic problem for publishers of content on the Internet is how to match available advertising, whether in the form of banners, text, or rich media, with content. Current approaches to this problem include Google's AdSense program. The AdSense program allows a website publisher to dynamically serve relevant advertisements on web pages by analyzing text on a web page and automatically selecting ads based on the page content. The AdSense program also allows for the website publisher to provide explicit "hints" in the form of keywords to suggest associations of content. In any case, if a visitor selects (e.g., clicks on) one of the AdSense ads served to the website, the website publisher is credited for the referral and is provided a fee. Google's AdSense program essentially allows approved websites to dynamically serve Google's advertisements paid for by advertisers.

Website maintenance related to the AdSense program requires very little effort. Webmasters need only to insert a Google-generated java script program into the web page or website template. A well-known spider program parses the website upon which the AdSense program is associated and serves ads that relate to the website's content. The AdSense program uses a combination of keyword matching and context analysis to determine what ads should be served. The java script program calls the ad from a Google website and ensures that ads are served each time a visitor loads a web page. AdSense also implements a filtering system that allows webmasters to prevent a specific domain's ads from being served on any websites in their account. By performing ad blocking, webmasters could prevent their competitor's ads from being dynamically served on their websites.

SUMMARY OF THE INVENTION

According to one aspect of the present invention, a social bookmarking system is provided having the capability of displaying ads based on user input provided to the social bookmarking system. In particular, it is appreciated that inputs to a social bookmarking system may be used to determine advertising displayed to the user. Such advertising may be displayed to the user while using the social bookmarking system, or may be presented while operating one or more other programs.

As is known, a social bookmark system and service allows multiple users to collect classification information of resources available in a distributed computing network. The classification information may be, for example, in the form of one or more "tags" associated with content such as that available through the Internet. Social bookmarking systems are typically used to organize references to content (e.g. URLs), and associate classification information with such references.

Examples of such systems include the del.icio.us bookmarking system and Internet service, available at http://del.icio.us, the Spurl.net bookmarking system and service available at http://www.spurl.net, among others. According to one aspect of the present invention, a distributed bookmark manager that collects tag information from multiple users is used to determine classification information that determines ad placement for content (e.g., as referenced by URL data). In one specific embodiment, such classification information is used to determine ad placement within the social bookmarking application itself.

According to one aspect of the present invention, ad placement may be determined by one or more actions performed by the user and/or information provided by the user to the social bookmarking system. For instance, ads displayed to a user may be determined based on one or more classifications (e.g., tags, organizational structures, etc.) selected by a user. In one particular example, the user may select a tag, and in response, a related advertisement may be displayed to the user in a user interface. The tag may be selected, for example, based on a search performed within the interface (e.g., by the user entering a particular tag in a search field, by "browsing" predefined tags defined within the social bookmarking system, etc.).

According to another embodiment, classification information created by, used by, or otherwise associated with the user may be used to select advertisements displayed to the user. For instance, the user may be provided his/her own capability for maintaining and storing classification information associated with various resources (e.g., Internet resources such as a web page). Classifications created or otherwise used by the user may be stored, for example, in a database, and shown to the user in an interface (e.g., a personal webpage) of the social bookmarking system. Such advertisements may be shown, for example, based upon tag information stored within a user's account. If a user is not registered or otherwise has an account, tag information used in a particular session may be stored and used to determine displayed advertisements within the session.

Thus, according to one embodiment of the present invention, advertisements may be shown to the user based upon behavior of the user (e.g., by the user selecting, browsing, and/or searching classification information. Either alone or in combination with behavior information, ads may be displayed to the user in response to historical information (e.g., in the form of a user's stored personal classifications, historical session-based classification information, etc.).

The user, while interacting with elements within the social bookmarking system, may be displayed ads determined by the user's defined classification information. Further, ads may be selected also based upon the content referenced by the user's tags (e.g., keywords within a referenced web page), and also other's tags associated with the referenced content. Ad determination may be performed, for instance, by a conventional ad matching program (e.g., the AdSense program), with information from the social bookmarking system (classification information, referenced content, lists of referenced content, content feeds, user selections, user searches, user-centric classification information, etc.) being used as inputs to determined what ads are selected for display to the user.

Thus, in summary, ads displayed to a user may be determined based on user-based actions (e.g., behavioral information as discussed above), saved information associated with the user or session (e.g., saved classifications, profile information (e.g., user's address, user's demographic information)) related to the user, and/or any other information used by the social bookmarking system (e.g., content of classification lists created by one or more users/organizations, classification linked to the social bookmarking system from other systems (e.g., by RSS feeds, etc.)).

According to one aspect of the present invention, an advertiser is permitted to create a list of classifications on a social bookmarking system and is permitted to advertise such classifications. For instance, an advertiser may have one or more web pages with which the advertiser would like to associate particular classifications. The advertiser may interface with the social bookmarking system and provide associations between classifications and reference content. In this way, the advertiser may generate their own classifications of their own content.

According to yet another aspect of the present invention, an operator of a social bookmarking system may be compensated for publishing classifications of the reference content from the advertisers. In one particular example, operators of the social bookmarking system are compensated when one or more users use the social bookmarking system to locate the advertiser's content. Such location may be performed, for example, by a user locating the content based on the classifications provided by the advertiser.

In another embodiment of the present invention, the advertiser may "subscribe" to particular classifications associated with their content. Unlike other methods of advertising where advertisers associate their content with classifications determined by an operator (e.g., Yahoo, Google; etc.), advertisers subscribe to classifications of their content as created by users. In this way, advertisers are more likely to identify and reach target audiences based on meanings attributed by users.

Further, as discussed above, the user may locate the content using classifications collected by the social bookmarking system. Further, advertisers may be compensated when their ads are selected by a user of the social bookmarking system. As discussed, display of such ads may be determined by user actions within the system and/or one or more classifications previously made by the user.

According to another aspect of the present invention, it is appreciated that conventional forms of determining advertising (e.g., ad matching programs such as the AdSense program) do not, in all cases, optimally match ads to content. According to one aspect of the present invention, it is appreciated that automatic methods of analyzing content based on contextual and keyword analysis do not always optimally match ads to corresponding web pages. A result of this suboptimal matching is that ads placed on these web pages generate less results (e.g., responses to ads that result in actions, "click-through" traffic, purchases, etc.) than ads that are correctly matched.

According to one aspect of the present invention, a method is provided for developing user-based classifications and using the resulting user classifications to determine advertising associations. As discussed, such advertising may be displayed to a user within a social bookmarking system. According to one specific aspect of the present invention, it is appreciated that users viewing website content are more capable of determining classification than automated programs. However, one drawback to manual classification is that the volume of available information on the Internet to be classified is too great for one entity to classify. Therefore, according to one embodiment of the present invention, a distributed system for collecting content classifications is provided. Such user classifications may be used alone or with conventional contextual classification mechanisms to determine matches between ads and website content.

According to one aspect of the present invention, Internet users bookmark Internet content, creating user classification data of that content. Such classification data may, for example, be in the form of one or more "tags" which, in one specific example, are keywords that the user associates with an Internet page. Although tag data may be used, it should be appreciated that other types of classification data can be used to classify data.

For instance, classification data may be in the form of a folder-based or other type of hierarchical structure used to organize information. Such a structure may be, for instance, a predetermined hierarchical structure in which users "place" content or references to content. In particular, the predetermined hierarchical structure may be predetermined by the user. In another example, the predetermined hierarchical structure is determined by some person or entity other than the user, and the user only places the content or references to content. In another example, users are capable of determining or suggesting one or more aspects of the classification structure. Traditionally, website developers could, in particular systems, subscribe their websites to a classification system (e.g., Yahoo) in which the website developers suggest particular tags or other classification data. However, according to one embodiment, the user is capable of determining how and what classifications are ascribed to content rather than the originators themselves.

According to one aspect of the present invention using tags, it is appreciated that these tags often provide very valuable clues as to what advertising should be displayed with a particular page, as the tags provide a subjective view as to what classification the user associates with that content, regardless of the actual content (e.g., keyword) that appear with the content. For instance, an article describing a restaurant in Miami might be tagged by many users as "vacation" or "travel". However, such as article may not include keywords that contain the terms "vacation" or "travel" or otherwise be contextually associated with these classifications. Thus, a user-defined classification may provide a more useful classification than an automatically-generated one based on content.

The tags and their associated page references may be provided (e.g., sold) to a website publisher for determining ad placement. In particular, the publisher could then use the provided tag information to select the appropriate ads for each page. These "tags" might also be used as keywords to be input into a system such as the AdSense program to associate ads with content. In the specific example of the AdSense program, the user classifications may be provided as hint data to the AdSense program. Thus, a more accurate way may be provided to associate ads to content, and to provide increased "click-through" traffic to those ads as a result.

According to one aspect of the present invention a method for selecting advertising is provided. The method comprises acts of collecting classification data from a plurality of users, wherein at least one portion of the classification data indicates a classification of content, determining, based on the at least one portion of the classification data, an advertisement, and presenting the advertisement to a user in response to the user performing an action with respect to the classification data. According to one embodiment of the invention, the method further comprises an act of determining an advertisement to be displayed to the user based on the user action. According to another embodiment, the user action includes a selection, by the user, of the at least one portion of the classification data. According to another embodiment, the user action includes entering, by the user, the classification data into a social bookmarking system. According to another embodiment, the user selects the at least one portion of the classification data in an interface of a social bookmarking system. According to another embodiment, the method further comprises acts of storing an association of the entered classification with the user, and determining the presented advertisement based on the stored classification information.

According to one embodiment of the invention, the method further comprises an act of storing a list of classifications with the user, and determining the presented advertisement at least in part based on the stored list of classifications. According to another embodiment, the method further comprises an act of associating the advertisement with the content. According to another embodiment, the act of collecting classification data further comprises an act of collecting one or more tags. According to another embodiment, the act of collecting the classification data further comprising an act of determining a classification performed through a user action. According to another embodiment, the act of determining includes determining whether the user associated the content with a particular classification. According to another embodiment, one or more tags include one or more keywords that describe the content.

According to one embodiment of the invention, the act of collecting the one or more tags further comprises an act of collecting the one or more tags by a collaborative computer system operated by the plurality of users. According to another embodiment, the content includes a website page and wherein the act of associating includes an act of associating the advertisement with the website page. According to another embodiment, the advertisement includes data, and the act of associating further comprises an act of associating the data with the content. According to another embodiment, one or more keywords are derived from at least one of the plurality of users. According to another embodiment, the method further comprises an act of providing the classification data to an entity to be used to determine the association of the advertisement with the content. According to another embodiment, the act of collecting classification data is performed by a plurality of computer systems.

According to one embodiment of the invention, the classification data is shared among a plurality of computer systems. According to another embodiment, the content is referenced by reference data, and wherein the act of associating includes an act of associating the advertisement with the reference data. According to another embodiment, the reference data includes a Uniform Resource Locator (URL). According to another embodiment, the classification data is shared among a plurality of application programs. According to another embodiment, the classification data is shared among the plurality of users.

According to one aspect of the present invention, a system for selecting advertising is provided. The system comprises a classification system adapted to provide classification data collected from a plurality of users, wherein the classification data includes a portion that classifies the content, and is adapted to associate the portion of the classification data with an advertisement, and an interface adapted to display an advertisement to a user in response to at least one user performing an action with respect to the classification data. According to one embodiment of the invention, the system further comprises an ad-matching component adapted to match the advertisement with content referenced by the classification data. According to another embodiment, the classification system is adapted to determine an advertisement to be displayed to the at least one user based on the action. According to another embodiment, the user action includes a selection, by the at least one user, of the at least one portion of the classification data. According to another embodiment, the classification system includes a social bookmarking system, and wherein the user action includes entering, by the at least one user, the classification data into a social bookmarking system.

According to one embodiment of the invention, the at least one user selects the at least one portion of the classification data in an interface of a social bookmarking system. According to another embodiment, the classification system is adapted to store an association of the entered classification with the user, and is adapted to determine the displayed advertisement based on the stored classification information. According to another embodiment, the classification system is adapted to store a list of classifications with the user, and is adapted to determine the displayed advertisement at least in part based on the stored list of classifications. According to another embodiment, the classification system is adapted to collect one or more tags. According to another embodiment, the one or more tags include one or more keywords that describe the content. According to another embodiment, the classification system further comprises a collaborative computer system operated by the plurality of users.

According to one embodiment of the invention, the one or more keywords are derived from at least one of the plurality of users. According to another embodiment, the plurality of users collectively provide the classification data. According to another embodiment, the content is referenced by reference data, and wherein the ad-matching component is adapted to associate the advertisement with the reference data. According to another embodiment, the reference data includes a Uniform Resource Locator (URL). According to another embodiment, the system further comprises a plurality of application components that share the classification data. According to another embodiment, the classification system is adapted to share the classification data among the plurality of users. According to another embodiment, the classification system is adapted to determine a classification performed through a user action. According to another embodiment, the classification system is adapted to determine whether the user associated the content with a particular classification.

According to one aspect of the present invention, a method for selecting advertising is provided. The method comprises acts of collecting classification data from a plurality of users, wherein at least one portion of the classification data indicates a classification of content, the content being related to an organization, and subscribing, by the organization, to the at least one portion of the classification data. According to another embodiment, the content includes a web page, and wherein the classification data includes at least one tag associated by at least one of the plurality of users to the web page, and wherein the method further comprises an act of subscribing, by the organization, to the at least one tag associated by the at least one of the plurality of users. According to another embodiment, the act of collecting classification data further comprises an act of collecting one or more tags.

According to one embodiment of the present invention, the act of collecting the classification data further comprises an act of determining a classification performed through a user action. According to another embodiment, the act of determining includes an act of determining whether the user associated the content with a particular classification. According to another embodiment, one or more tags include one or more keywords that describe the content. According to another embodiment, the act of collecting the one or more tags further comprises an act of collecting the one or more tags by a collaborative computer system operated by the plurality of users. According to another embodiment, the method further comprises an act of providing, by the organization, classification data relating to the content. According to another embodiment, the method further comprises an act of providing, by the organization, tag information relating to the content. According to another embodiment, the method further comprises an act of maintaining, by the organization, a list of tags associated with content provided by the organization.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A shows an example process for creating classification data according to one embodiment of the present invention;

FIG. 3B shows an example process for publishing classification data according to one embodiment of the present invention;

FIG. 3C shows an example process for displaying advertisements in a social bookmarking application according to one embodiment of the present invention;

FIGS. 4A-4B show an example process for creating classification data according to one embodiment of the present invention;

DETAILED DESCRIPTION

Figure 1:
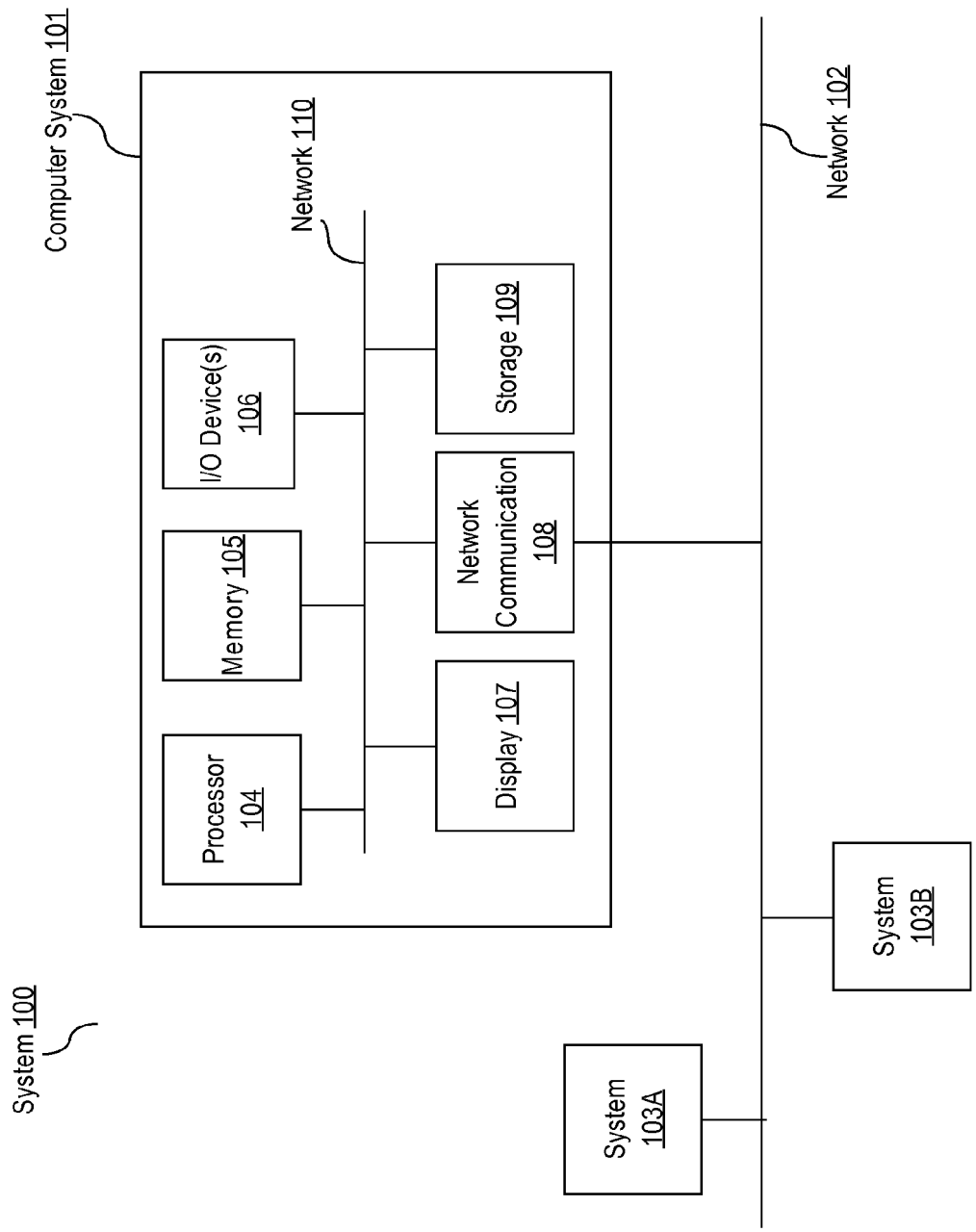
FIG. 1 shows an example computer system upon which various aspects of the present invention may be implemented.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, one aspect of the present invention relates to displaying advertisements based on one or more inputs provided to a social bookmarking system. For instance, such advertisements may be displayed to the user while using the social bookmarking system. According to one embodiment, advertisements may be determined based on one or more actions performed by the user and/or information provided by the user to the social bookmarking system. For instance, ads displayed to a user may be determined based on one or more classifications (e.g., tags, organizational structures, etc.) selected by a user.

For example, a user may select a particular tag within an interface of the social bookmarking system, and an advertisement based at least in part on that selected tag may be displayed to the user in the user interface. The user may then select the advertisement, if interested. Further, the social bookmarking system may store information relating to classifications of a user and may use such information to determine displayed ads specific to the particular user.

In general, ads displayed to a user may be determined based on user-based actions, saved information associated with a user or session, and/or any other information used by the social bookmarking system. For example, user-based actions such as behavioral information as discussed above may be used to determine a displayed ad. Further, either alone or in combination with user-based actions, saved information associated with the user or session such as, for example, saved classifications, profile information (e.g., user's address, user's demographic information) related to the user may be used to determine ad placement. Also, any other information may be used in conjunction with any of the information above to determine the display of advertisements. For instance, content of classification lists created by one or more users/organizations, classification linked to the social bookmarking system from other systems (e.g., by RSS feeds, etc.)) may be used to determine displayed ads.

Further, as discussed above, one aspect of the present invention relates to system for collecting user classifications of content and using such classifications to match appropriate ads to corresponding content. In such a manner, more appropriate associations between ads and content may be made. According to one aspect of the present invention, the ads may be presented to one or more users of a social bookmarking system.

Another aspect of the present invention relates to a process for creating user classifications. More specifically, a distributed process for creating a classification data is provided that allows a user to create classifications of content that may be shared among systems, applications and users. Generally, there are many ways that users can classify data. However, classifications of data are generally limited to a specific user, applications and/or systems. For instance, e-mail items in the well-known Microsoft Outlook application program are restricted to the folders created within the application. Thus, a user could not use the same folder to organize items other than those types available within the Outlook application program.

According to one aspect of the present invention, it is realized that there are restrictions to using classification structures across domains, such as users, systems, and applications. According to one specific aspect of the present invention, a system is provided wherein classification structures can be shared among data objects (e.g., those that contain content) in an open manner. To this end, a distributed system is provided for sharing classifications and references to content.

The system may be adapted to display, for example, reference information such as Uniform Resource Locator (URL) information. Such reference information may refer, for example, to a website page referenced by a URL address. In one embodiment, the system is capable of storing one or more user classifications associated with content referenced by the URL. The classification information may be, according to one embodiment of the present invention, tag information including one or more keywords that describe the referenced content.

A tag may itself have more than one keyword associated with it (e.g., a multiple word tag). Such tags using multiple elements may include, for example, one or more keywords presented in a particular format. In one example using a multiple word tag, keywords may be separated by one or more spaces (e.g., "household pet"), other types of characters (e.g., "books:fiction"), or no character (e.g., "newyorkyankees"). It should be appreciated that tags may have any type of formatting, and the invention is not limited to single-word tags.

Such tag information may be collected in a distributed manner from multiple users. Users may also be permitted to view tags used by other users to classify a particular page, and to use other's classifications for classifying content. To this end, the system may present to a user a listing of classifications used by other users to classify currently-viewed content.

The system may include, in one specific example, a system for managing bookmarks in a browser program executing on a local computer system. Such bookmark manager programs are well-known, and are used to organize URL information. Examples include the del.icio.us bookmarking system and Internet service, available at http://del.icio.us, the Spurl.net bookmarking system and service available at http://www.spurl.net, among others. According to one aspect of the present invention, a distributed bookmark manager that collects tag information from multiple users is used to determine classification information that determines ad placement for content (e.g., as referenced by URL data).

In one such bookmark management system, a bookmark management program is executed by a user's browser program. The bookmark management program performs functions relating to storing and classifying URL information based on input from the user. For example, the bookmark management program permits the user to associate a currently-viewed URL with one or more keywords or "tags."

In one such bookmark manager program, URLs classified by the user are stored in a database located on a network (e.g., stored centrally on a network server or distributed among a number of systems in a distributed database). In this way, the user may access his/her bookmarks from one or more systems or locations. Further, because bookmark information is located on a server, such information may be shared with other systems and/or users. For example, bookmark information may be shared among a plurality of users, the users operating a client system. The users may, for example, use a browser program (e.g., the Microsoft Internet Explorer browser program or other type of browser program) to access a bookmark service to classify information. Users may, alternatively or in addition to accessing bookmark information through a browser program, access bookmark information through one or more application programs and/or operating systems.

According to various aspects of the present invention, a server-based system may collect classification from one or more client types. In one example, the client system may be a browser-based system that permits the user to classify content and provide classification data to the server-based system in real time. However, the server-based system may collect classification information from other types of clients (e.g., thick or thin clients, different types of client systems (cell phones, PDAs, web servers, etc.), different types of programs (OSs, programs, etc.). These other types of clients may provide such classification in real time, may provide information periodically, or may provide information at defined times (e.g., when a specific action is taken on the client). In this way, the server system is capable of collecting and distributing classification information to a variety of client and system types.

According to one embodiment of the present invention, such tag information is collected by a collaborative system that collects tag information from multiple users. The system may include a number of features to facilitate user's classifications, such as, for example, displaying classifications from other users for the same content. This feature may permit, for example, the user to refine their own use of tags, or use additional tags for classifying a particular content reference (e.g., URL). Further, the system may show, to the user, URLs associated with the same or related tag information. This feature may allow the user to locate related content previously located and classified by other users. Other features may include a listing of most recently bookmarked URLs, most frequently bookmarked URLs, and a subscription feature that allows a user to subscribe to other's bookmarks having similar interests.

The system may also be capable of providing any or all of the bookmark information to other programs via, for example, an RSS feed, API, or other programming mechanism. The interface to the system may permit, for example, the user and/or applications to store, edit, categorize, and retrieve bookmark information. Thus, application developers may extend the functions of applications including, but not limited to, browsers, desktop client programs, and API bindings for various programming languages. The system may store the information in one or more databases (e.g., object, relational, or other database type). Alternatively or in addition to traditional databases, information may be stored in any other database format such as flat-file or other data structure file format (e.g., XML).

In this way, user classifications may be collected and provided to website owners or other entities for determining ad placement. Such classification information may be sold to entities that provide Internet services, such as, for example ad services and/or Internet search services. Further, such classification information may be used to locate Internet resources in place of or along with conventional Internet search utilities.

As discussed above, advertisers using the collaborative system may allow the advertiser to associate particular classifications to content provided by the advertiser. This may permit, for example, the advertiser to publish their own classifications to the collaborative system, and those published classifications may be used by users of the collaborative system. In particular, the users may use the classifications, such as tags or any other organizational structure, to locate the content provided by the advertiser.

In one aspect of the invention, the advertiser may compensate an operator of the collaborative system (e.g., a social bookmarking system) when the advertisers content is located using the system. In this way, the advertiser may control which associations are made with their content and may share such classifications with other users so that their content can be located. To this end, the collaborative system may include one or more interface elements that permit an advertiser to publish classification information associated with their content. According to one embodiment, a user acting on behalf of the organization (the advertiser) may log into the collaborative system as a user, and create, delete, and modify classifications attributed to the organization. Such classifications may be shared with other users.

General Purpose Computer System

Various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type computer system may be used to determine ad placement according to various embodiments of the invention. Further, the system may be located on a single computer or may be distributed among a plurality of computers attached by a communications network.

A general-purpose computer system according to one embodiment of the invention is configured to perform any of the described functions, including but not limited to, storing, editing, categorizing, and retrieving bookmark information. It should be appreciated that the system may perform other functions, including storing and/or managing bookmark information, sharing bookmark information, etc., and the invention is not limited to having any particular function or set of functions.

FIG. 1 shows a block diagram of a general purpose computer and network system in which various aspects of the present invention may be practiced. For example, various aspects of the invention may be implemented as specialized software executing in one or more computer systems including general-purpose computer system 101 shown in FIG. 1. Computer system 101 may include a processor 104 connected to one or more memory devices 105, such as a disk drive, memory, or other device for storing data. Memory 105 is typically used for storing programs and data during operation of the computer system 101. Components of computer system 101 may be coupled by an interconnection mechanism such as network 110, which may include one or more busses (e.g., between components that are integrated within a same machine) and/or a network (e.g., between components that reside on separate discrete machines). The interconnection mechanism enables communications (e.g., data, instructions) to be exchanged between system components of system 101.

Computer system 101 also includes one or more input/output (I/O) devices 106, for example, a keyboard, mouse, trackball, microphone, touch screen, a printing device, display screen, speaker, etc. In addition, computer system 101 may contain one or more interfaces (e.g., network communication device 108) that connect computer system 101 to a communication network (in addition or as an alternative to the network 110.

The storage system 109, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 109, as shown, or in memory system 105. The processor 104 generally manipulates the data within the integrated circuit memory 104, and then copies the data to the medium associated with storage 109 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 101 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architectures or components that that shown in FIG. 1.

Computer system 101 may be a general-purpose computer system that is programmable using a high-level computer programming language. Computer system 101 may be also implemented using specially programmed, special purpose hardware. In computer system 101, processor 104 is typically a commercially available processor such as the well-known Pentium class processor available from the Intel Corporation. Many other processors are available. Such a processor usually executes an operating system which may be, for example, the Windows-based operating systems (e.g., Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within system 100. For instance, the system may be a distributed system (e.g., client server, multi-tier system). In one example, the system includes software processes executing on a system associated with a user (e.g., a client system). These systems may permit the user to associate classification information with one or more references to content (e.g., a URL).

Example System Architecture

Figure 2:
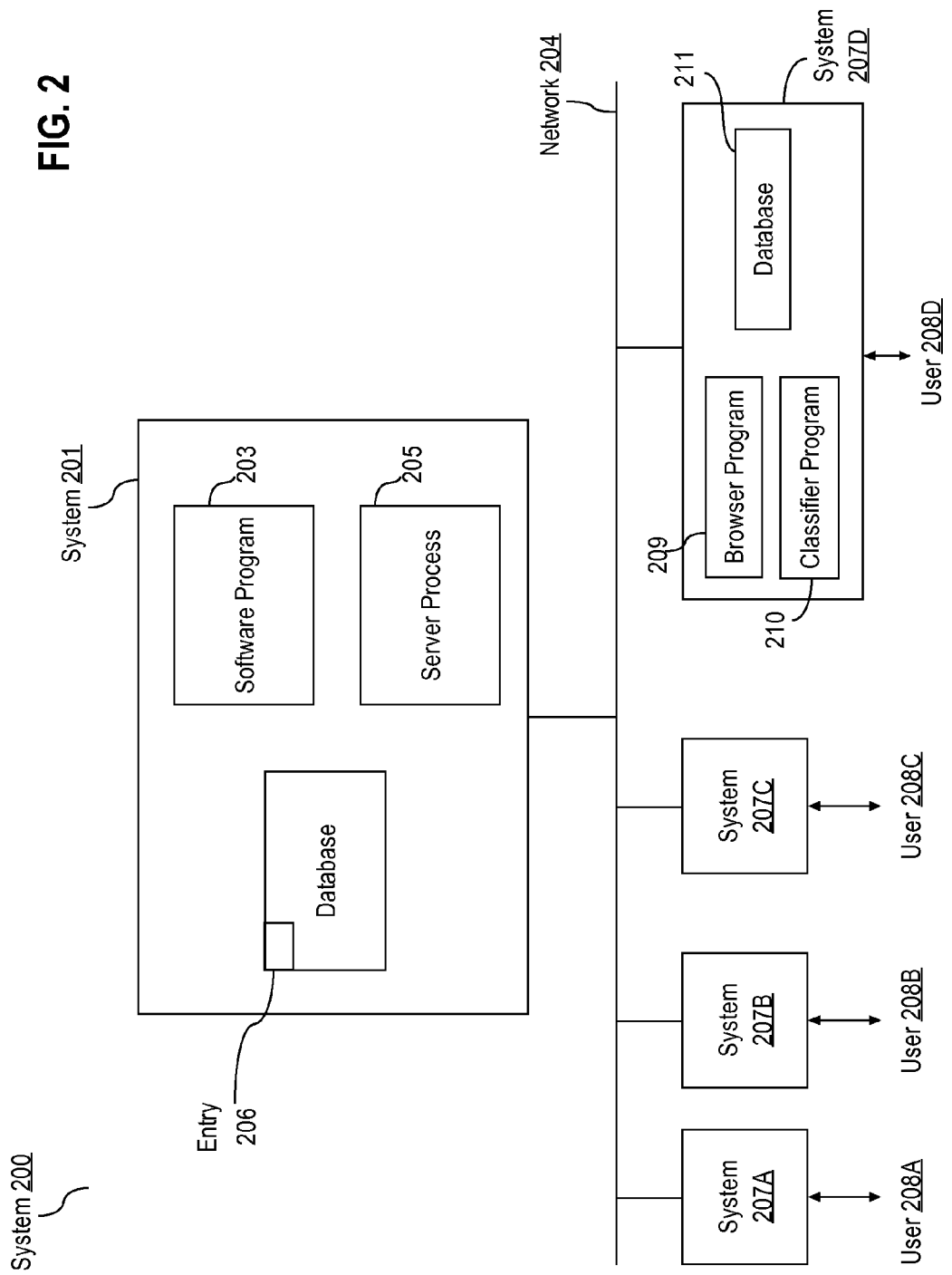
FIG. 2 shows an example system architecture according to one embodiment of the present invention.

FIG. 2 shows an architecture diagram of an example system according to one embodiment of the invention. It should be appreciated that FIG. 2 is used for illustration purposes only, and that other architectures may be used to facilitate one or more aspects of the present invention.

As shown in FIG. 2, a distributed system 200 may be used to create and store user classification information. System 200 may include one or more computer systems (e.g., systems 201, 208A-D) coupled by a communication network 204. Such computer systems may be, for example, general-purpose computer systems as discussed above with reference to FIG. 1.

In one embodiment of the present invention, system 201 stores classification information in the form of tag information in one or more databases (e.g., database 202). Further, system 201 performs associated functions with the tag information.

System 201 may include a server process (e.g., process 205) that responds to requests from one or more client programs. Process 205 may include, for example, an HTTP server or other server-based process (e.g., a database server process, XML server, peer-to-peer process) that interfaces to one or more client programs distributed among one or more client systems (e.g., systems 207A-207D).

According to one embodiment, client programs may be capable of permitting a user to classify content. Such programs may include, for example, any type of operating system and/or application program capable of communicating with system 201 through network 204. In one particular instance, a client may include a browser program (e.g., browser program 209) that communicates with server process 205 using one or more communication protocols (e.g., HTTP over a TCP/IP-based network, XML requests using HTTP through an Ajax client process, distributed objects, etc.).

Although it is shown by way of example that a browser program may be used to classify data, it should be appreciated that other program may be used to interface a user to server process 205. For instance, an application program that is specially-developed to manage classification data may be provided to permit a user to perform classifications according to one embodiment of the present invention. The client program may be, for example, a thin client including an interface for managing classification data, although such classification data may or may not be stored on the client. Alternatively, the client may be a scripted program, or any other type of program having the capability of transferring classification data. According to one embodiment, such client programs may, for example, be downloaded and installed over the network. Further, these client programs may be stored and distributed by system 201 in the form of one or more software programs 203.

In one specific example, the client program may include a classifier program 210 that permits the user to associate classification data with one or more references to content (e.g., URLs). This classifier program 210, in one embodiment, may be integrated with browser program 209 executing on system 207D. For instance, the classifier program 210 may include one or more controls that, when selected by the user, perform storing, editing, and other functions of tag information. These controls may be written in a variety of programming languages, and the invention is not limited to any particular language. In one specific example, the control may be a bookmark that, when accessed, performs one or more programmed functions.

In one embodiment, the controls may be displayed as selections in the user's bookmark list. When selected, one type of control may permit the user to associate tag information with the currently-viewed URL. In another type of control, the user may be permitted to view a list of tags previously associated with the user. To this end, the user may be presented a web page that includes defined tags and their associated URL data. Yet another type of control may permit the user to see tags defined by others. In particular, the system may permit a user to see what other users have bookmarked a specific URL. Further, the capability may be provided for a user to view URLs collected by others, and subscribe to the links of users whose lists of URLs are interesting to the user. Additional capabilities may be provided to permit the user to organize Internet information and to benefit by other's previous organization of content.

Information stored in the database 202 may include, for example, a URL address, one or more keywords associated with the URL address, a description of the URL, among other information that may be used to describe and classify content. This information may be collected from the user in an interface (e.g., as described below with reference to FIG. 4) and stored in the database (e.g., database 202). Additionally, client systems may store a local copy of a user's tag information with a local database associated with the client system (e.g., database 211 located on client system 207D). However, it should be appreciated that the invention is not limited to storing classification information in any particular location.

A client system (e.g., clients 207A-207D) may include one or more interfaces through which advertisements may be presented to the user. In one example, advertisements may be presented in an interface of a browser program (e.g., browser program 209) executing on a client computer system. As discussed, one aspect of the present invention relates to receiving inputs through an application (e.g., a social bookmarking system) and using such inputs to determine ads displayed to a user (e.g., users 208A-208D). Such ads may be displayed, for instance in an interface associated with a social bookmarking application program.

To this end, a client system may advocate the ability to display advertisements in an interface, either the same or different interface, as the application accepting the input from the user. As will be further appreciated below with respect to a social bookmarking application, the application may determine and display advertisements to the user based on classification information collected by the social bookmarking application and/or actions performed by the user within the interface of the social bookmarking application. For instance, a database classification information used by the user may be used to determine a particular advertisement displayed to the user in the social bookmarking application at any point in time. Such classification information may be, for example, stored in the social bookmarking application and represents the user's historical creation of classification information. In one particular example, the classification information includes classifications of Internet resources (e.g., web pages) that identify the user's association of the content to the classifications. System 200 may use such classifications as inputs to an ad selection program (e.g., the AdSense program). For instance, in the case of the AdSense program, the classifications may be used as keyword inputs to determine a selected ad.

FIG. 3A shows a general process 300 for creating classification data according to one embodiment of the present invention. At block 301, process 300 begins. In one example system, a user may be capable of providing classification data that classifies one or more portions of content. Such a user may be an individual that uses a system (e.g., system 200) to make, use and store classification information. In another embodiment, the user may represent an organization, permitting that user to provide classification information on behalf of the organization. Thus, the organization may be permitted to publish classification information associated with their content.

At block 302, a computer system (e.g., a client computer, server computer or other computer or process) determines classification data based on a user action. For instance, the user may associate one or more tags with content, place a portion of content in a particular folder, or any other user action that may be used to create a classification.

Further, a computer system may store the classification. The classification data may be stored locally at a computer system operated by the user, and/or may be stored centrally at a server. In one embodiment, classification data may be stored for each user over time. Such advertising may be ads that are available to be displayed to a particular user, and selected for individual users based on the stored classifications.

At block 303, the classification data is used select advertising to be displayed to a user. For instance, the advertising may be displayed to the user in a current computer session (in the same or different application interface) based on the classification provided. Further, advertising may be selected based on stored classification information for the user. In one specific example, classifications collected over time may be used by the system (e.g., a social bookmarking system) to determine ads to be displayed to the user. For instance, for a particular portion of content (e.g., one referenced by a URL), one or more of the most frequently-occurring keywords associated with a particular URL may be used as classification information to determine selected advertising. In one specific example, such keywords may be used as inputs to an ad-matching program such as AdSense to determine advertising selected for display to the user.

At block 304, the selected ads may displayed to the user. Such display may occur, for example, on a display associated with the same or a different computer system. Further, the selected ads may be displayed in a presently-occurring or future computer session. At block 305, process 300 ends.

FIG. 3B shows a general process 310 for publishing classification data according to one embodiment of the present invention. At block 311, process 310 begins. In one example system, a user representing an advertiser is permitted to provide classification information on behalf of an organization. In particular, the user may provide one or more tags to be associated with content. At block 312, the user determines classification information for the advertised content. Such classifications may include, for example, tags or any other classification information that the organization would like associated with the particular content.

At block 313, the user, on behalf of the organization, is permitted to publish the classification information to a social bookmarking system. As discussed, the social bookmarking system may permit access to previously-defined classification associated with a user. According to one embodiment, the social bookmarking system is modified to allow the publication and sharing of classifications originating from organizations.

According to one embodiment, the organization may use classification information to classifications created by users that refer to their content. In one specific example, advertisers may subscribe to particular tags or other classification information that reference their content. Rather than provide their own recommendations regarding classifications of their content, the organization may use classifications provided by users as indications of the "meaning" that should be attributed to the advertiser's content. In this way, the meaning attributed by users may prove to be a more effective determinant of advertising than conventional targeting techniques originated solely by advertisers. More particularly, the meaning of content as attributed by users may be a more accurate input for determining ads to be displayed to such users than a selection of an association between ads and content as performed by an advertiser. For instance, if a classification provided by a user for a restaurant in Miami is associated by a user with keywords "vacation" or "travel", the advertiser may choose to subscribe to such keywords or combinations thereof rather than (or in addition to) some other advertiser-generated classification.

In one specific embodiment, the classification information relates to content provided by the organization. Such information may be provided, for example, by a user representing the organization and providing classification information on their behalf. Other methods (e.g., linking to a list of classifications, providing classification data through an API of the social bookmarking system, etc.) may be used for transferring classification data to the social bookmarking system.

At block 314, an operator of the social bookmarking system is permitted to charge an advertiser based on a function of user actions relating to the defined classifications. In one specific example, a user selects a classification defined by an organization that originates the content associated with the classification. Once selected, the organization (the advertiser) may be charged a fee. Fees may be charged, for example, when a user selects content through advertiser-based classifications, selection of particular advertisements displayed within the social bookmarking application, and/or when a user completes an action (e.g., a purchase) with the referenced content. At block 315, process 310 ends.

FIG. 3C shows an example process for displaying advertisements in a social bookmarking application according to one embodiment of the present invention. At block 321, process 320 begins. At block 322, a user initiates a social bookmarking application. As discussed, such an application may include any application which may be used to organize and associate classification information with references to content (e.g., URLs). Such applications may be application programs installed and initiated on a computer, may be associated with a browser application program, or may be a combination of an installed and an Internet-based application.

According to one embodiment, ad placement may be determined by one or more actions performed by a user and/or information provided by the user to a social bookmarking system. For instance, at block 323, a user may be permitted to select one or more predefined tags displayed to the user within a user interface of the social bookmarking application. Such predefined tags may be, for example, tags defined by other users, tags defined by the particular user in a listing of personal tags, or other type of classification information (e.g., a folder that contains a reference to content).

Another action may include, for example, performing a search by the user of tag information at block 324. More particularly, the user may enter tag information in a search field of an interface of the social bookmarking application and perform a search based on the entered tag information. In one embodiment, the social bookmarking application maintains a database of tags defined by users of the application, and users are permitted to search based on tag information. Also, the user may be permitted to search on other related information, such as a description attributed to the reference to content, title of the reference, title of the content, metadata associated with the referenced content, portions of the content itself, and/or any other associated information.

In another example, a user, at block 325, saves one or more classifications of content in the social bookmarking application. This may be done, for example, by associating one or more tags with a reference to content (e.g., a URL). One method of associating classification information with content is discussed below with respect to FIG. 5.

At block 326, the social bookmarking application may be adapted to select advertising based on one or more actions performed by the user (e.g., actions performed at blocks 323-325). In one example, when a user selects a predefined tag at block 323, advertising associated with the selected tag may be displayed to the user (at block 327). In this example, the advertising may be displayed shortly after the user selects the predefined tag. In yet another example, the advertising may be displayed some point after the user performs the selection.

In another example, as the user performs a search of tag information in the social bookmarking system, advertisements may be displayed to the user based on the search parameters and/or results associated with the search. For instance, one or more keywords entered in a search field may be used as inputs to an ad determining program. In another example, keywords associated with tags defined in the system corresponding to keywords entered in the search field may be used to locate an ad displayed to a user.

In yet another example, ads displayed to the user may be selected based on classification information associated with that user (e.g., by the user saving classifications at block 325). Thus, the user's behavior may be monitored by the social bookmarking application to determine what advertisements are displayed to a user. What advertisements displayed may be based at least in part on the user's use of such classifications, how many content elements are associated with a particular classification, when such a classification was previously accessed, or other behavioral item associated with a particular classification.

According to one embodiment, the operator of the social bookmarking application may be compensated for actions performed in response to the display of the advertisements. In particular, at block 328 it is determined whether a user performs an action in response to the display of the advertisement. In one example, the user may perform a purchase based on the displayed advertisement, or may take any other action with respect to the displayed content. If the user does not perform an action, the social bookmarking application continues to accept further inputs to the user. However, if it is determined that the user performs an appropriate action, a charge back to the advertiser may be determined at block 329.

In this way, the operator of the social bookmarking application may be compensated for referrals provided by the system.

FIGS. 4A-4B show an example process 400 for creating classification (e.g., tag) data according to one embodiment of the present invention. At block 401, process 400 begins. In one example system (e.g., system 200 discussed above with reference to FIG. 2), a user may have an associated user account with which tag information is associated. This account may permit, for example, the user to access tag information from multiple systems, to share tag information with other users, and other functions.

At block 402, the user accesses his/her account. Access may be performed, for example, by the user entering a login identifier (e.g., a user name) and password. Optionally, it is determined whether the user has an associated account, and if not, the user may be permitted to create an account to manage his/her tag information. If, for example, the system on which the user is operating does not have an associated client program installed, the system may install any necessary software (e.g., classifier program 210) at block 403. The software may be programmed in any language or combination of languages, and the invention is not limited to any particular language or set of languages.

As discussed above, the client program may be integrated with a browser program (e.g., browser program 209) installed on the client system (e.g., system 207D). At block 405, the user loads content into a browser program interface by, for example, entering a specific URL in an address line of the browser interface, or by selecting a link to the URL from another URL reference (e.g., a search function).

The user may select to classify the currently-viewed URL by, for example, selecting a control within an interface of the browser. In response to selecting the control, the program may prompt the user at block 406 to classify the content. The prompting may be displayed, for example, in a same or different window of the browser interface that displays the selected content. Specifically, the interface may prompt the user to enter one or more tags associated with the URL. These tags may be, according to one embodiment, keywords that describe the content referenced by the URL.

At block 407, the system saves the collected classification information. As discussed, the information may be stored in a database of a server coupled to the client over a communication network. Classification information may also be stored local to the client (or in any other location) so that the information may be accessed by the client when not connected to the network, or when the information is accessed by other applications when not connected to the network.

At block 408, the classification information may be collected and maintained by the system over time. For instance, the system may maintain classification information received from individual users over time. This information may be consolidated and used as classification information to select advertising at block 409. For instance, for a particular URL, one or more of the most frequently-occurring keywords associated with a particular URL may be used as classification information to determine selected advertising. In one specific example, such keywords may be used as inputs to an ad-matching program such as AdSense.

Once selected, the ads may be associated with the URL described by the classification information (e.g., at block 410). The ads themselves may include data and/or programs that present advertisements to users. The ad content may be linked with, embedded in, or otherwise associated with the web page referenced by the URL. The ads may be displayed when the URL is subsequently loaded in a browser program (e.g., block 411). The URL may be subsequently loaded by the same or a different browser program instance (e.g., a browser program instance existing on another client system). In this manner, user-selected classifications of the content may be used to associate ads with the referenced content. At block 412, process 400 ends.

Although FIGS. 4A-4B discussed above show a process that involves the creation of classifications using a browser program, it should be appreciated that classifications may be performed using any type of computer system and/or application, and the invention is not limited to any particular implementation. For example, the classification system may be implemented in an operating system and/or application, permitting users and/or programs to classify information, and any resulting classification information can be used to associate ads with content.

Figure 5:
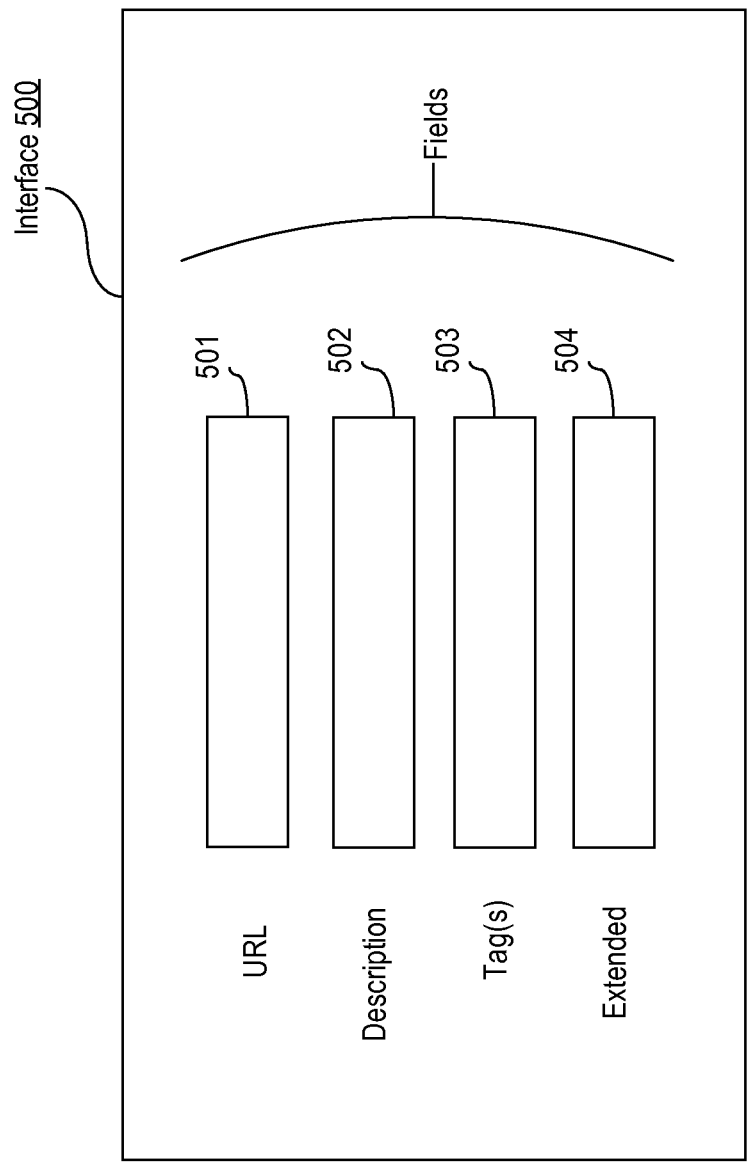
FIG. 5 shows an example interface through which a user may enter classification information according to one embodiment of the present invention.

FIG. 5 shows an example interface in which classification information may be entered by a user into the system (e.g., system 200). Interface 500 may be presented to the user in a display of a computer system (e.g., a client system). Interface 500 may include, for example, an entry window having one or more fields (e.g., fields 501-504) in which data may be entered. The entry window may be the same or a different window used to display the content to be classified. In one specific example, the entry window may be shown in a browser interface or portion thereof. For instance, the entry window may be displayed in a frame of the browser interface.

As discussed above, the entry window may include one or more data entry fields in which classification information may be entered. In particular, the entry window may include a URL field 501 in which a URL address or other reference information may be entered. Interface 500 may also include a description field 502 that includes, for example, a text-based description of the URL content. By default, description 502 may include a stored title or filename of the content. Interface 500 may also include a tag field 503 in which classification information may be entered. In one example, the classification information may be in the form of one or more keywords associated with the content reference. Interface 500 may include other information, stored in the above or additional fields. For instance, an extended field 504 may be used to store an extended description of the content entered by the user. This extended field 504 may also include one or more tags or other classifying information that may be used to describe content.

According to one specific embodiment of the present invention, tag data may be developed using a social bookmarking system operated by multiple users. For instance, the well-known del.icio.us web service is a web service that provides users the ability to store and organize their bookmarks, share their bookmarks with others and find new bookmarks that may be of interest to them. According to one embodiment of the present invention, it is appreciated that a bookmarking system/service such as the del.icio.us service may be used to provide classification information for use in determining ad placement. Although various aspects of the present invention may be implemented with the del.icio.us web service, it should be appreciated that various aspects of the present invention may be implemented in other systems/services, and the invention is not limited thereto.

Figure 6:
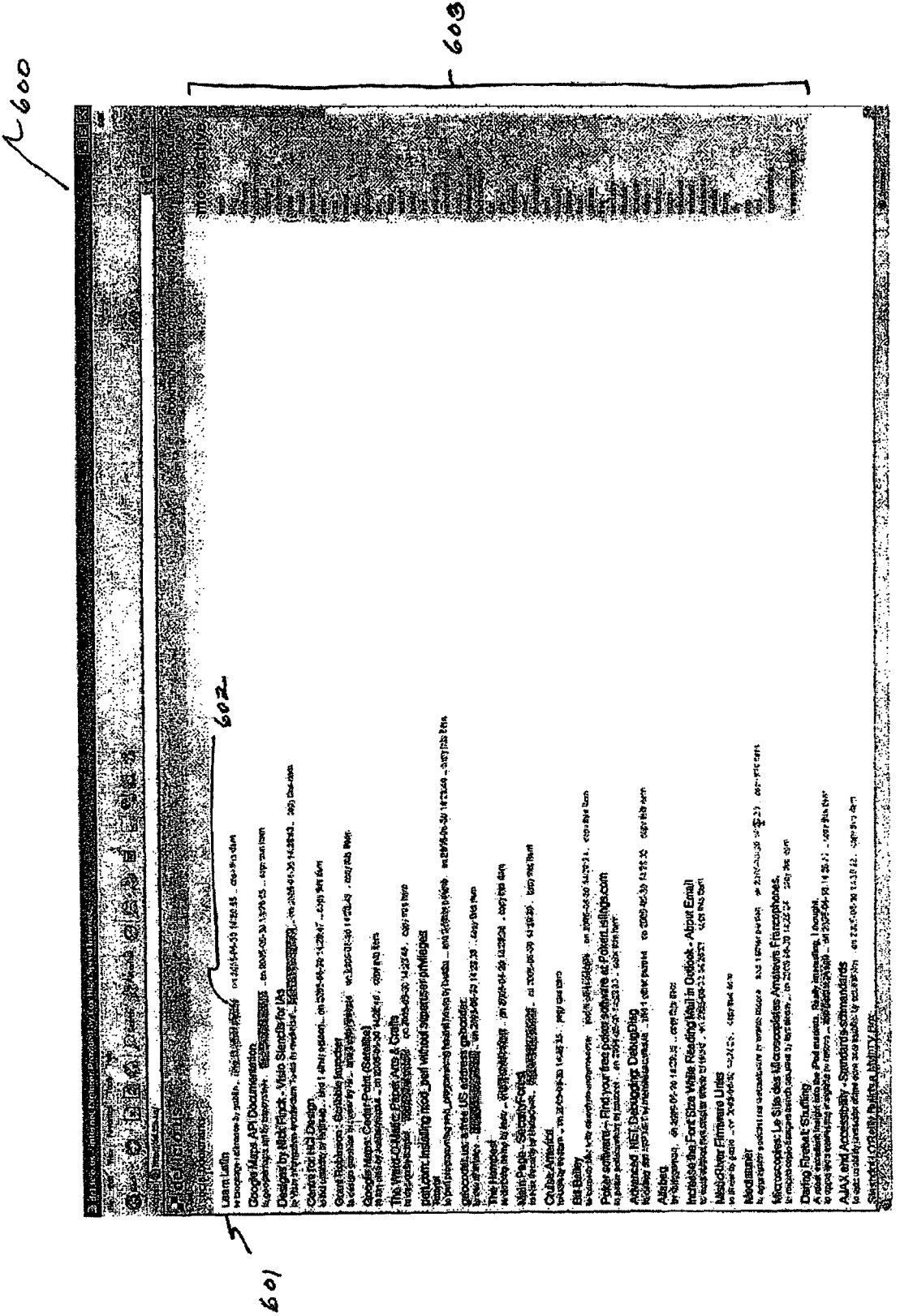
FIG. 6 shows an example interface of a social bookmarking system that may be used to produce classification data according to one embodiment of the present invention.

As discussed, the del.icio.us system is a social bookmark management system. An interface of one such social bookmark management system is shown by way of example in FIG. 6. FIG. 6 shows an interface 600 which may be, for example, a browser program interface (e.g., the Microsoft Windows Explorer browser). Within interface 600 may be displayed a main interface or page to a social bookmarking system (e.g., the del.icio.us system).

This interface may include one or more bookmarks (e.g., bookmark 601) that reference content, such as data stored on a website. Such data may be referenced by a link, such as a URL. Link data may be associated with each bookmark and stored in a database. For instance, link data may be collected from a user within an interface similar to interface 500 discussed above with reference to FIG. 5. Further, within an interface of the system, a bookmark may show an indication (e.g., indicator 602) of how many other users have bookmarked a particular portion of content.

The system allows users to easily add sites to a personal collection of links, to categorize those sites with keywords, and to share the collection not only between applications and systems, but also with other users. What makes the del.icio.us system a social bookmarking system is its ability to let users see links that other users have collected (e.g., a list of top-ranked bookmarks (e.g., list 603)), as well as showing other users who have bookmarked specific content (e.g., a website page referenced by a URL). Users can also view the bookmarks of links collected by others, and subscribe to bookmarks of people whose lists the user finds interesting.

According to one embodiment, tags are one-word descriptors that a user can assign to any reference to content (e.g., a bookmark). A user is permitted to assign as many tags to a bookmark as desired, and rename, delete, add or merge tags together. A selectable list (e.g., list 701 of FIG. 7) of all of the user's current tags may be displayed, for example, on the right-hand side of the user's personal page, together with the number of bookmarks that have that tag. A user can assign tags to an item when the user first submits a bookmark, or by selecting an "edit" link (e.g., element 705 of FIG. 7) next to an existing bookmark. In one example, tags are automatically created the first time the user uses them. In a user's personal page such as the one shown in FIG. 7, a user can view an indicator (e.g., indicator 704) that shows how many other users have previously bookmarked a particular URL.

In another example interface, a user can merge, rename or delete tags whenever desired by selecting the "settings" tab on the user's personal page, and selecting "tags" from the "Settings" menu (e.g., of menus 706) on the right side of the interface (e.g., interface 700) or by entering the URL http://del.icio.us/USERNAME/settings/tags in an address field of the browser interface. The user may be then presented a pull-down menu of all the user's current tags, along with a text field. To rename all instances of a tag, the user enters a new tag name in the text area. To merge two tags, a user selects the tag to be merged and renames the tag to the name of an existing tag. To split a tag into two or more pieces, a user enters multiple tags in a "rename" field. To delete a tag, a user selects the tag from the pull down menu and selects a "Delete" button.

Features of the del.icio.us system can be broadly divided into the following four general functional areas:

Saving and Organizing Bookmarks

To save bookmarks in the del.icio.us system, a user creates an account and installs a del.icio.us "bookmarklet." The bookmarklet is a program that adds a control (e.g., a button) to the browser's "links" or "bookmarks" toolbar. In one embodiment, the control acts similarly to the browser's built-in "bookmark this website" feature. In one specific example, the bookmark is stored on a server operated by the del.icio.us website. In another example, the feature may be part of an application (e.g., Explorer) or operating system, or may otherwise be previously installed on a client system.

After navigating to a website of interest and pressing the bookmarklet button, the user is presented with an interface with fields showing the URL of the currently viewed website, its title (editable) and additional fields for entering an optional paragraph-length description of the site and an optional list of free-form descriptive keywords. In the context of the del.icio.us system, keywords entered by a user to describe a particular bookmark are referred to hereinafter as "tags."

Figure 7:
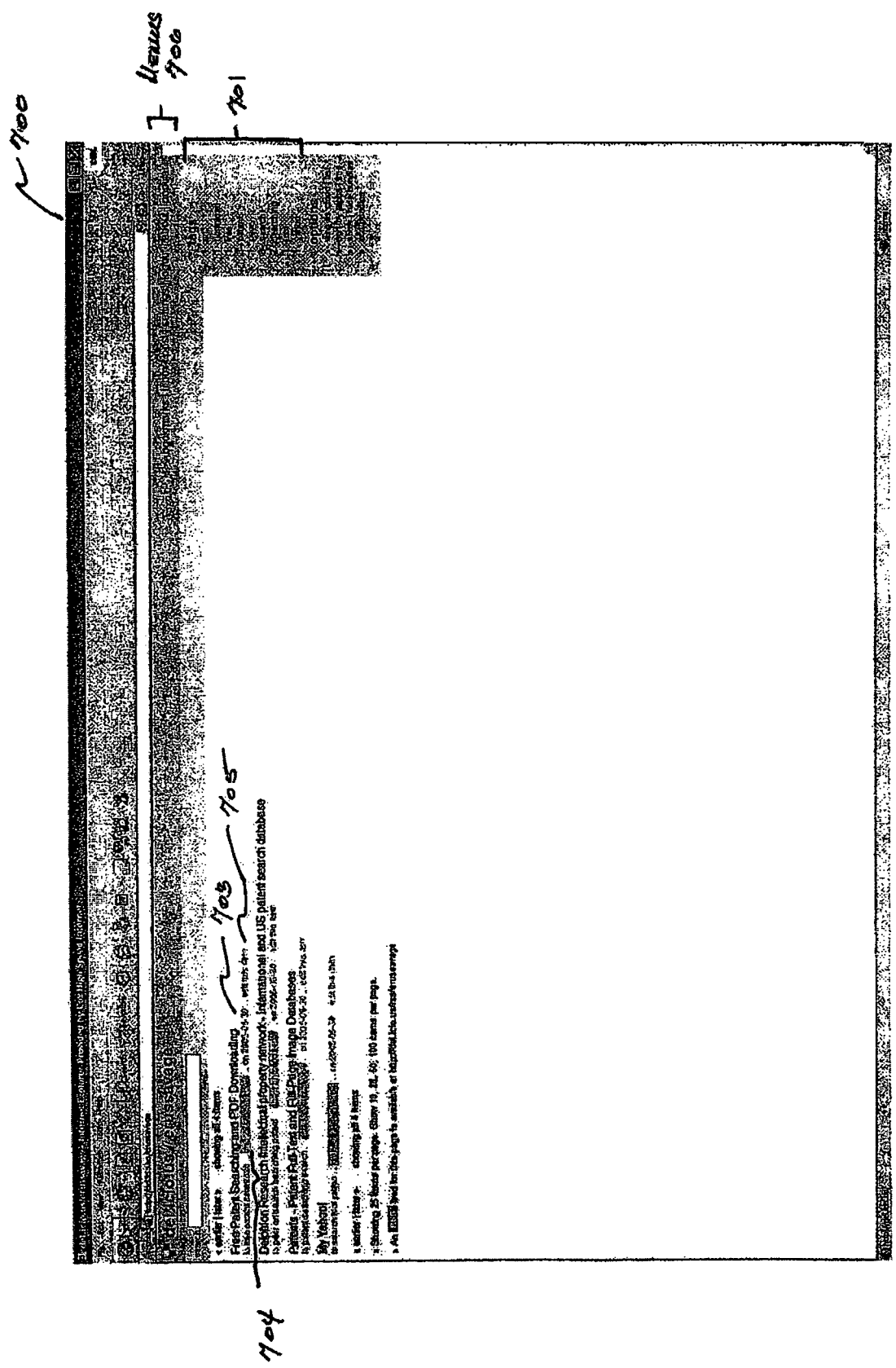
FIG. 7 shows an example interface showing a personal page that may be used to classify data according to one embodiment of the present invention.

Bookmarks saved by the user are listed on a personal page created for the user referred to hereinafter as a "personal" page (e.g., as shown by way of example in FIG. 7). A section of this personal page also lists all the tags used by a user and the number of bookmarks tagged with a given tag. Selecting (e.g., by "clicking on") a tag name restricts the display of bookmarks to those tagged with that particular tag name. Additionally, a list of tags that have been used together with the selected tag is displayed as "related tags". Tag/related tag lists serve, for example, as mnemonic and navigational aids with which the user can locate bookmarks previously saved by other users.

Sharing and Finding New Content

The del.icio.us system provides several mechanisms for finding bookmarks of interest saved by other users. These mechanisms provide the "social" aspect of the del.icio.us system.

The front page of the del.icio.us service (e.g., interface 600 of FIG. 6) may show an updated list of the top URLs bookmarked (and, therefore, classified) by del.icio.us users (e.g., list 603).

A page of recently popular URLs may be presented, upon which the URLs most frequently bookmarked by users are listed in order of popularity. Popularity may be determined, for example, by a ranking of the number of times a particular URL has been classified over a specified period of time.

Each listed URL may include a selectable numerical indicator (e.g., indicator 602) of how many other users have bookmarked the URL. Upon selection of the indicator, a list may be displayed of all bookmarks of that URL as described and tagged by others. This feature allows a user to find other users having similar interests.

Users are allowed to navigate to pages listing the bookmarks by all users for a particular tag. This feature allows, for example, the user to find URLs about a particular topic.

Users can subscribe to other user's bookmark lists, a particular tag used by a given user or bookmarks tagged with a given tag.

An aggregated list of the user's defined tags may be shown on a user's "inbox" page, allowing the user to create and track a personalized feed of content of interest.

Syndication and Publishing

Various pages, such as, for example, user personal pages, main page, popular page, global and per-user tag pages, or other pages may be made available as RSS feeds, allowing users to subscribe to them with online or desktop aggregators and form their own custom views on the del.icio.us system classification data. A user can, for instance, use RSS feeds provided by the del.icio.us system to add the del.icio.us popular content to his or her my.yahoo.com page or view their personal inbox through, for example, the well-known Firefox browser's Live Bookmarks feature. Additionally, the del.icio.us system can periodically post the user's recent bookmarks to a user's blog, automating the maintenance of linkblogs. Similarly, an organization (e.g., an advertiser) may subscribe and/or publish classification data.

Integration and Extension

The del.icio.us system provides a REST-style open programmatic application program interface (API) to a user's own content. A set of API calls are provided that mimic the functionality generally available to a user. That is, the API calls mimic the storing, editing, categorizing and retrieving functions performed with bookmarks and their associated information. This functionality allows third-party developers to develop tools that implement the del.icio.us system and integrate del.icio.us features into other products. Many tools have been developed, including, but not limited to del.icio.us extensions for several popular browsers, desktop clients, API bindings for popular programming languages and others.

According to one aspect of the present invention, such interfaces may be leveraged to permit other applications, operating systems, and/or computer systems to share classification data. In this way, classification data is more easily shared, and effort for classifying data in separate applications, computer systems, etc. are reduced. Further, the quality of classification data is increased as more entities (applications, computers, users) share and add to the classification data.

del.icio.us Technology

The del.icio.us system is, in one example, a databasedriven system including a database interface program loaded on a client with the database being located on a server system. For instance, the del.icio.us system may include an architecture similar to system 200 as discussed above with reference to FIG. 2. In one embodiment, URL link and tag information posted by users may be stored, for example, in a relational database for later retrieval. The database information may, according to another embodiment, be broken up and distributed across several tables to enable fast processing of queries. Further, the system may maintain link and tag information posted by users in a structured format (e.g., XML). Full-text indexing and distributed inverse indices may be used to locate information for retrieval.

Although various aspects of the present invention may be used with the del.icio.us system, it should be appreciated that other systems, services, and/or applications may be used. Further, systems having different components or architecture may be used to collect and store classification data. Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method comprising:

receiving, from a first user of a social bookmarking system, one or more keywords that classify a reference to a content, wherein the one or more keywords are not included in the reference;

wherein the one or more keywords are not included in the content;

in response to receiving the one or more keywords from the first user, associating the one or more keywords with the reference;

based on the association between the one or more keywords and the reference, automatically creating an association between the reference and an advertisement that also is associated with the one or more keywords;

receiving, from a second user who has not submitted keywords to the social bookmarking system, a request for the content; and in response to the second user's request for the content, and based on the association between the reference and the advertisement, presenting at least the advertisement to the second user;

wherein the method is performed by one or more computing devices.

2. The method of claim 1, further comprising:

receiving, from an advertiser, a request to associate an advertisement with at least one of the one or more keywords;

associating the advertisement with the at least one of the one or more keywords;

wherein automatically creating the association between the reference and the advertisement based on the association that exists between the advertisement and the at least one of the one or more keywords.

3. The method of claim 1, wherein the first user is an advertiser and the content is advertising content provided by the advertiser.

4. The method of claim 1, further comprising:

generating a social bookmarking web page, wherein generating a social bookmarking web page comprises:

generating a first control for receiving the reference to the content;

generating a second control for receiving a description of the content;

generating a third control for receiving tags associated with the content;

transmitting the web page to the first user;

wherein the one or more keywords that classify the reference to the content are received from the first user via the social bookmarking web page.

5. The method of claim 1, wherein the content is a web page and the reference is a uniform resource locator (URL) for the webpage.

6. A non-transitory computer-readable storage medium storing instructions which, when executed by one or more processors, cause the processors to perform steps comprising:

receiving, from a first user of a social bookmarking system, one or more keywords that classify a reference to a content, wherein the one or more keywords are not included in the reference;

wherein the one or more keywords are not included in the content;

in response to receiving the one or more keywords from the first user, associating the one or more keywords with the reference;

based on the association between the one or more keywords and the reference, automatically creating an association between the reference and an advertisement that also is associated with the one or more keywords;

receiving, from a second user who has not submitted keywords to the social bookmarking system, a request for the content; and in response to the second user's request for the content, and based on the association between the reference and the advertisement, presenting at least the advertisement to the second user.

7. The non-transitory computer-readable storage medium of claim 6, wherein the instructions, when executed by the one or more processors, cause the processors to perform steps comprising:

receiving, from an advertiser, a request to associate an advertisement with at least one of the one or more keywords;

associating the advertisement with the at least one of the one or more keywords, wherein automatically creating the association between the reference and the advertisement based on the association that exists between the advertisement and the at least one of the one or more keywords.

8. The non-transitory computer-readable storage medium of claim 6, wherein the first user is an advertiser and the content is advertising content provided by the advertiser.

9. The non-transitory computer-readable storage medium of claim 6, wherein the instructions, when executed by the one or more processors, cause the processors to perform steps comprising:

receiving an indication that the second user performed an action with respect to the advertisement;

determining a chargeback to an advertiser associated with the advertisement.

10. The non-transitory computer-readable storage medium of claim 6, wherein the instructions, when executed by the one or more processors, cause the processors to perform steps comprising:

generating a social bookmarking web page, wherein generating a social bookmarking web page comprises:

generating a first control for receiving the reference to the content;

generating a second control for receiving a description of the content;

generating a third control for receiving tags associated with the content;

transmitting the web page to the first user;

wherein the one or more keywords that classify the reference to the content are received from the first user via the social bookmarking web page.

11. The non-transitory computer-readable storage medium of claim 6, wherein the content is a web page and the reference is a uniform resource locator (URL) for the webpage.

* * * * *